(12) United States Patent
Slamkul et al.

(10) Patent No.: US 9,727,187 B2
(45) Date of Patent: Aug. 8, 2017

(54) CAPACITIVE TOUCH PANEL WITH BALANCED PARALLEL DRIVING

(71) Applicant: Sharp Kabushiki Kaisha, Osaka (JP)

(72) Inventors: Dauren Slamkul, London (GB); Christopher James Brown, Oxford (GB); Andrew Kay, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 138 days.

(21) Appl. No.: 14/688,666

(22) Filed: Apr. 16, 2015

(65) Prior Publication Data
US 2016/0306456 A1    Oct. 20, 2016

(51) Int. Cl.
*G06F 3/044* (2006.01)

(52) U.S. Cl.
CPC .................. *G06F 3/044* (2013.01)

(58) Field of Classification Search
CPC ....... G06F 3/044; G06F 3/0418; G06F 3/0416
See application file for complete search history.

(56) References Cited

U.S. PATENT DOCUMENTS

| | | | |
|---|---|---|---|
| 4,293,734 A | 10/1981 | Pepper | |
| 7,663,607 B2 | 2/2010 | Hotelling et al. | |
| 8,730,197 B2 | 5/2014 | Hamaguchi et al. | |
| 2008/0158167 A1 | 7/2008 | Hotelling et al. | |
| 2010/0060591 A1 | 3/2010 | Yousefpor et al. | |
| 2012/0013565 A1* | 1/2012 | Westhues | G06F 3/0418 345/174 |
| 2012/0056841 A1 | 3/2012 | Krenik et al. | |
| 2013/0201154 A1* | 8/2013 | Yun | G06F 3/044 345/174 |
| 2013/0257786 A1* | 10/2013 | Brown | G06F 3/044 345/174 |
| 2014/0009428 A1 | 1/2014 | Coulson et al. | |

FOREIGN PATENT DOCUMENTS

| | | |
|---|---|---|
| WO | 2012/160839 | 11/2012 |
| WO | 2012/169215 | 12/2012 |

\* cited by examiner

*Primary Examiner* — Alexander Eisen
*Assistant Examiner* — Abhishek Sarma
(74) *Attorney, Agent, or Firm* — Renner, Otto, Boisselle & Sklar, LLP

(57) ABSTRACT

A capacitive touch sensor includes an array of electrode elements, each electrode element including a drive electrode and a sense electrode, the drive electrode and the sense electrode forming at least one mutual coupling capacitor in each electrode element. A controller is operatively coupled to the array of electrode elements, the controller configured to measure the at least one mutual coupling capacitance over at least one measurement period. In addition, excitation signals applied during the at least one measurement period are balanced to reduce the effect of baseline capacitance.

19 Claims, 21 Drawing Sheets

$$\begin{pmatrix} -1 & +1 & -1 & +1 & -1 & +1 & -1 \\ +1 & -1 & -1 & +1 & +1 & -1 & -1 \\ -1 & -1 & +1 & +1 & -1 & -1 & +1 \\ +1 & +1 & +1 & -1 & -1 & -1 & -1 \\ -1 & +1 & -1 & -1 & +1 & -1 & +1 \\ +1 & -1 & -1 & -1 & -1 & +1 & +1 \\ -1 & -1 & +1 & -1 & +1 & +1 & -1 \end{pmatrix} \qquad \begin{pmatrix} -1 & +1 & -1 & -1 & +1 & -1 \\ +1 & -1 & -1 & +1 & -1 & -1 \\ -1 & -1 & +1 & -1 & -1 & +1 \\ -1 & +1 & -1 & +1 & -1 & +1 \\ +1 & -1 & -1 & -1 & +1 & +1 \\ -1 & -1 & +1 & +1 & +1 & -1 \end{pmatrix}$$

FIG 7

$$C = \begin{Bmatrix} CA_{1,1} & CA_{1,2} & \cdots & CA_{1,M} \\ CA_{2,1} & CA_{2,2} & \cdots & CA_{2,M} \\ \vdots & \vdots & \ddots & \vdots \\ CA_{N,1} & CA_{N,2} & \cdots & CA_{N,M} \\ CB_{1,1} & CB_{1,2} & \cdots & CB_{1,M} \\ CB_{2,1} & CB_{2,2} & \cdots & CB_{2,M} \\ \vdots & \vdots & \ddots & \vdots \\ CB_{N,1} & CB_{N,2} & \cdots & CB_{N,M} \end{Bmatrix} = \begin{pmatrix} CA \\ CB \end{pmatrix}$$

FIG 10C $$C = \begin{Bmatrix} CA & CA & \cdots & CA \\ CA & CA & \cdots & CA \\ \vdots & \vdots & \ddots & \vdots \\ CA & CA & \cdots & CA \\ CB & CB & \cdots & CB \\ CB & CB & \cdots & CB \\ \vdots & \vdots & \ddots & \vdots \\ CB & CB & \cdots & CB \end{Bmatrix} = \begin{pmatrix} CA \\ CB \end{pmatrix} \qquad D2 = \begin{pmatrix} D & 0 \\ 0 & D \end{pmatrix}$$

$$S = D2 \times C = \begin{pmatrix} D & 0 \\ 0 & D \end{pmatrix} \begin{pmatrix} CA \\ CB \end{pmatrix} = D \times CA + D \times CB = 0$$

$$M = U \times S = D2^{-1} \times D2 \times C = C$$

FIG 11

$$C = \begin{Bmatrix} CA & CA & \ldots & CA \\ CA & CA & \ldots & CA \\ \vdots & \vdots & \ddots & \vdots \\ CA & CA & \ldots & CA \\ CB & CB & \ldots & CB \\ CB & CB & \ldots & CB \\ \vdots & \vdots & \ddots & \vdots \\ CB & CB & \ldots & CB \end{Bmatrix} = \begin{pmatrix} CA \\ CB \end{pmatrix} \qquad D2 = \begin{pmatrix} D & D \\ D & -D \end{pmatrix}$$

$$S = D3 \times C = \begin{pmatrix} D & D \\ D & -D \end{pmatrix} \begin{pmatrix} CA \\ CB \end{pmatrix} = D \times CA + D \times CB + D \times CA - D \times CB \approx 0$$

$$M = U \times S = D3^{-1} \times D3 \times C = C$$

FIG 12

CAPACITIVE TOUCH PANEL WITH BALANCED PARALLEL DRIVING

TECHNICAL FIELD AND APPLICATIONS OF THE INVENTION

The present invention relates to touch panel devices. In particular, this invention relates to capacitive type touch panels. Such a capacitive type touch panel device may find application in a range of consumer electronic products including, for example, mobile phones, tablet and desktop PCs, electronic book readers and digital signage products.

BACKGROUND ART

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is the surface capacitive method—also known as self-capacitance—for example as disclosed in U.S. Pat. No. 4,293,734 (Pepper, Oct. 6, 1981). A typical implementation of a surface capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electrostatic field above the substrate. When an input object 13 that is electrically conductive—such as a human finger—comes into close proximity to the sensing electrode, a capacitor 14 is dynamically formed between the sensing electrode 11 and the input object 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels is the projected capacitive method—also known as mutual capacitance. In this method, as shown in FIG. 2, a drive electrode 20 and sense electrode 21 are formed on a transparent substrate (not shown). A changing voltage or excitation signal is applied to the drive electrode 20 from a voltage source 22. A signal is then generated on the adjacent sense electrode 21 by means of capacitive coupling via the mutual coupling capacitor 23 formed between the drive electrode 20 and sense electrode 21. A current measurement means 24 is connected to the sense electrode 21 and provides a measurement of the size of the mutual coupling capacitor 23. When the input object 13 is brought to close proximity to both electrodes, it forms a first dynamic capacitor 27 to the drive electrode 20 and a second dynamic capacitor 28 to the sense electrode 21. If the input object is connected to ground, as is the case for example of a human finger connected to a human body, the effect of these dynamically formed capacitances is manifested as a reduction of the amount of capacitive coupling in between the drive and sense electrodes and hence a reduction in the magnitude of the signal measured by the current measurement means 24 attached to the sense electrode 21.

As is well-known and disclosed, for example in U.S. Pat. No. 7,663,607 (Hotelling, Feb. 6, 2010), by arranging a plurality of drive and sense electrodes in a grid to form an electrode array, this projected capacitance sensing method may be used to form a touch panel device. An advantage of the projected capacitance sensing method over the surface capacitance method is that multiple simultaneous touch input events may be detected.

A schematic representation of an exemplary electrode array used in a conventional mutual capacitance touch panel is shown in FIG. 3a. The electrode array includes a plurality of drive electrodes 20 and a plurality of sense electrodes 21 with the mutual capacitors 23 formed at each intersection between any drive electrode and any sense electrode. The drive electrodes 20 are connected to separate voltage sources 22, each of which can supply a voltage excitation signal to the corresponding drive electrode. The sense electrodes are connected to a current measurement means 24, which measures the current generated on each sense electrode by the voltage excitation signal applied to the drive electrodes. The capacitances of all mutual capacitors in the electrode array are measured according to a driving sequence, the timing diagram for which is shown in FIG. 3b. A single frame period ($T_{FRAME}$) consists of four measurement periods ($t_{S1}$, $t_{S2}$, $t_{S3}$ and $t_{S4}$). In order to measure the capacitances of the mutual coupling capacitors, the same voltage excitation signal is applied to the drive electrodes one by one, such that during the first measurement period the voltage excitation signal is applied to the first electrode, during the second measurement period the same voltage excitation signal is applied to the second drive electrode, and so on. When the voltage excitation signal is applied to the last electrode of the electrode array, the sequence starts from the beginning to obtain the data for the next frame of operation. The patterns of voltage excitation signals applied during one frame of operation may be represented as a matrix 36, which is an identity matrix in this example.

It is well-known that the accuracy of the estimation of the location of the conductive object may be improved by increasing the signal-to-noise ratio (SNR) associated with the measurement of the capacitance of the mutual coupling capacitors in the array. A known method of increasing the SNR of a system that employs projected capacitance sensing method is disclosed, for example, in US20100060591 (Yousefpor, filed Sep. 10, 2008 and publish Mar. 11, 2010) According to this method, all of the drive electrodes are excited simultaneously during the measurement period. Each drive electrode is supplied with one of two (or more) possible types of signal that differ from each other in amplitude or phase or both. A timing diagram for an alternative driving sequence is shown in FIG. 4. As previously, the capacitances of all mutual capacitors in the electrode array are measured during one frame period ($T_{FRAME}$) that consists of four measurement periods ($t_{S1}$, $t_{S2}$, $t_{S3}$ and $t_{S4}$). During one measurement period voltage excitation signals are applied to all drive electrodes of the electrode array and the currents generated in the sense electrodes are measured. The patterns of voltage excitation signals applied to the drive electrodes are different during each measurement period. The patterns of voltage excitation signals applied during one frame of operation may be represented as a matrix 41. A limitation of this method, however, is that the current measurement means 24 may saturate whilst making the capacitance measurements. For example, the capacitance of the mutual capacitors may comprise a portion that changes due to the presence of an object and fixed offset that is insensitive to presence of an input object. The offset signal, also known as the baseline signal may be significantly larger than the maximum change signal. Saturation may arise in the current measurement means due to the presence of the large baseline capacitance signal. As a result, the dynamic range of the sensor may be reduced and the performance of the touch panel may be degraded.

A known solution to the problem described above is to excite the drive electrodes in a pattern corresponding to a maximum length sequence, or M-sequence. Such a system is described in, for example, U.S. Pat. No. 8,730,197 (Hamaguchi, filed Jan. 23, 2012 and issued May 20, 2014). However, since the length of an M-sequence is limited to values that are equal to $2^n-1$, where n is an integer number, this method is not suitable for touch panels where the number of drive electrodes is not equal to $2^n-1$.

In a further application of capacitive touch panels, if the sensitivity of the sensor is sufficiently high, objects may be detected at some distance from the sensor substrate. A method of calculating the position and height above surface of input objects is disclosed in U.S. 20140009428 (Coulson, Jan. 9, 2014). The signal-to-noise ratio and dynamic range requirements of such a system may however be more stringent that conventional applications.

A means is therefore sought to operate the touch panel in such a way as to maximize the signal-to-noise ratio of the capacitance measurement without negatively impacting the dynamic range.

SUMMARY OF THE INVENTION

A method in accordance with the present invention enables measurement of capacitance in a capacitive touch panel with improved signal-to-noise ratio (SNR) and maximized dynamic range. The capacitive touch panel includes an array of electrode elements with each electrode element including at least one drive electrode and one sense electrode. Mutual coupling capacitors are formed between the drive electrode and sense electrode in each electrode element. The capacitance of the mutual coupling capacitors may change due to the presence of an input object in close proximity to the surface of the touch panel. The input object may be, for example, a finger or a pen, or a stylus or the like. The capacitance of a mutual coupling capacitor without the presence of an input object, known as the baseline capacitance, may be significantly larger than the change in capacitance caused by the input object.

Voltage excitation signals are applied to the drive electrodes and the resulting signals generated on the sense electrodes may be measured and used to determine the capacitance of the mutual coupling capacitors. Examination of the capacitance changes of the mutual coupling capacitors provides information about the presence and location of one or more input objects.

In accordance with the present invention, the capacitances of the mutual coupling capacitors are measured during one frame period that consists of multiple measurement periods. During each measurement period, voltage excitation signals are applied to multiple drive electrodes simultaneously. Each drive electrodes in the array may be excited by a first voltage excitation signal, a second voltage excitation signal or held at a constant voltage. The first voltage excitation signal and second voltage excitation signal may differ from each other in amplitude, or in polarity or in phase. Further, the voltage excitation signals applied during one measurement period may be balanced.

The voltage excitation signals applied to the drive electrodes over the course of a single frame may be represented as matrix D, of dimension N×T, where N is the number of drive electrodes in the electrode array, and T is the number of measurement periods in one frame, which may be equal to the number of drive electrodes in the electrode array i.e. T=N, making D of dimension N×N. Each row of matrix D represents the pattern of the excitation signals applied to the drive electrodes at one particular measurement period. Each column represents the pattern of excitation signals applied to one particular drive electrode over the course of a single frame of operation. Each element of the array is either equal to 1 or −1 representing application of the first voltage signal or second voltage signal respectively. In order to balance the voltage excitation signals, the drive matrix may be chosen so that the sum of each row of the drive matrix is minimized such that it is equal to, or close to, zero. Accordingly, the baseline capacitances of the mutual coupling capacitors in the array do not contribute to the signal measured on the sense electrodes. The changes in capacitance of the mutual capacitors of the array that represent the presence of input objects may therefore be measured with maximum SNR and with maximum dynamic range.

According to one embodiment, a capacitive touch sensor includes: an array of electrode elements, each electrode element including a drive electrode and a sense electrode, the drive electrode and the sense electrode forming at least one mutual coupling capacitor in each electrode element; and a controller operatively coupled to the array of electrode elements, the controller configured to provide excitation signals to the array of electrode elements over at least one measurement period, and to measure the at least one mutual coupling capacitance over the at least one measurement period, wherein the excitation signals applied during the at least one measurement period are balanced to reduce the effect of baseline capacitance.

According to one embodiment, the at least one measurement period comprises a first measurement period and a second measurement period, and the excitation signal applied during the first measurement period is different from the excitation signal applied during the second measurement period.

According to one embodiment, the number of drive electrodes excited by the excitation signal during the first measurement period is substantially the same as the number of drive electrodes excited during the second measurement period.

According to one embodiment, the excitation signals comprise at least one of a first voltage signal having a first amplitude and first phase, a second voltage signal having a second amplitude and second phase, or a constant voltage.

According to one embodiment, the controller is configured to represent the excitation signals applied to the drive electrodes over one frame as a drive matrix D having dimension N×T, where N is the number of drive electrodes in the array of electrode elements and T is the number of measurement periods in the one frame, each row of the matrix representing a pattern of excitation signals applied to the drive electrodes during a measurement period, and each column of the matrix representing a pattern of excitation signals applied to one drive electrode over the course of a single frame.

According to one embodiment, the controller is configured to represent measurements of each sense electrode during the one frame as a sense matrix S having dimension T×M, where M is the number of sense electrodes.

According to one embodiment, the controller is configured to determine the capacitances of the mutual coupling capacitors by multiplying the sense matrix S by the inverse of the drive matrix D.

According to one embodiment, a first excitation signal is represented in the drive matrix D as a 1 and a second excitation signal is represented in the drive matrix D as a −1, and wherein the drive matrix D is chosen such that the sum of each row of the drive matrix is approximately 0.

According to one embodiment, the controller is configured to measure the mutual capacitances in the array during a frame period that includes multiple measurement periods.

According to one embodiment, the sensor includes: a drive unit coupled to the array of electrode elements, the drive unit configured to provide a drive excitation signal to the drive electrodes of the array of electrode elements, wherein the controller is operatively coupled to the drive unit to cause the drive unit to provide the drive excitation signal to the drive electrodes of the electrode array.

According to one embodiment, the drive unit comprises a plurality of signal generating circuits, each signal generating circuit providing a drive excitation signal to a respective drive electrode of the array of electrode elements.

According to one embodiment, the sensor includes a sense unit coupled to the array of electrode elements, the sense unit configured to measure a signal generated on the sense electrodes in response to the drive excitation signal applied to the drive electrodes According to one embodiment, the sense unit includes a plurality of signal sensing circuits, each signal sensing circuit operative to measure a signal generated on a respective sense electrode of the array of electrode elements in response to the drive excitation signal.

According to one embodiment, each electrode of the array of electrode elements comprises a sense electrode and a pair of drive electrodes, the pair of drive electrodes arranged such that a first drive electrode of the pair is adjacent to the sense electrode, and a second drive electrode of the pair is separated from the sense electrode by the first drive electrode.

According to one embodiment, the controller is configured to represent the excitation signals applied to the drive electrodes over one frame as a drive matrix D2 having dimension 2N×2N, where N is the number of drive electrode pairs in the array of electrode elements, and wherein a first half of the columns of the drive matrix D2 represents signals supplied to each first drive electrode over the course of a frame period and a second half of the columns represents signals supplied to each second drive electrode over the course of the frame period, a first half of the rows of the drive matrix D2 represent a first phase of the frame period and a second half of the rows of the drive matrix D2 represent a second phase of the frame period.

According to one embodiment, the controller is configured to represent measurements of each sense electrode during the one frame as a sense matrix S having dimension T×M, where T is the number of measurement periods in the one frame and M is the number of sense electrodes.

According to one embodiment, the controller is configured to determine the capacitances of the mutual coupling capacitors by multiplying the sense matrix S by the inverse of the drive matrix D2.

According to one embodiment, a sum of all elements in a first half of each row of the drive matrix is approximately 0, and a sum of all elements in a second half of each row of the drive matrix is approximately 0.

According to one embodiment, the drive matrix is constructed such that all drive electrodes are supplied with a first excitation signal or a second excitation signal during any measurement.

According to one embodiment, each electrode element comprises a sense electrode pair, further comprising a differential sensing device operatively coupled to the sense electrode pairs.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

FIG. 7 shows reduction of dimensionality of an exemplary drive matrix of size 7×7 down to the drive matrix of size 6×6

FIG. 10C shows a matrix representation of capacitances of an array of electrode elements FIG. 11 shows the a mathematical representation of a measurement procedure in accordance with a second embodiment of the invention FIG. 12 shows the form of the drive matrix D3, as well as theoretical expressions for signal matrix S and capacitance matrix C according to the third embodiment.

DESCRIPTION OF REFERENCE NUMERALS

Figure 1:
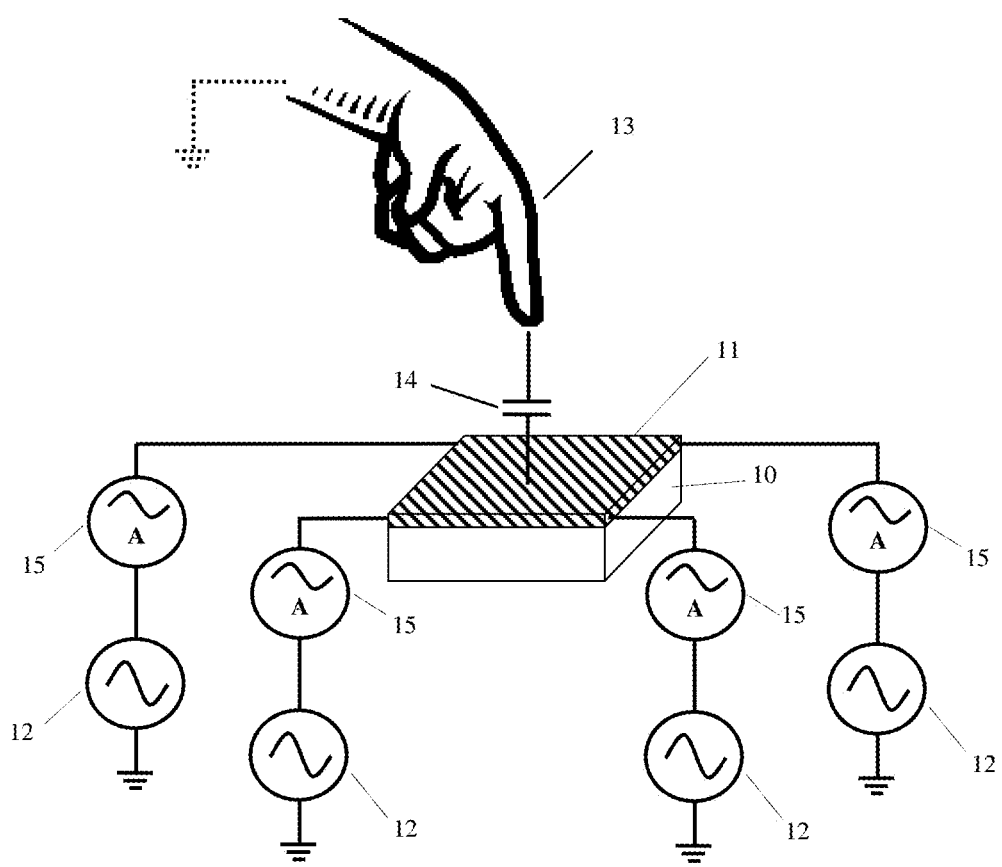
FIG. 1 shows a typical implementation of a surface capacitance type touch panel.
Figure 2:
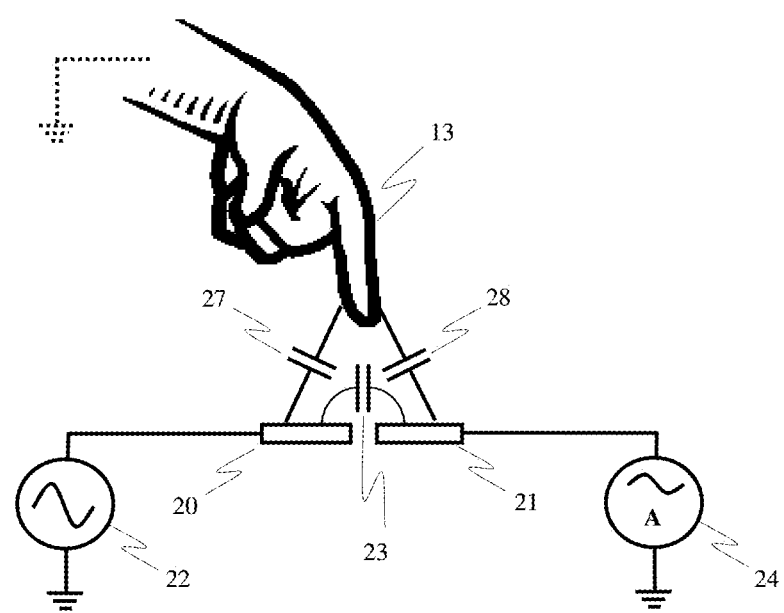
FIG. 2 shows a typical implementation of a projected capacitance type touch panel.
Figure 3A:
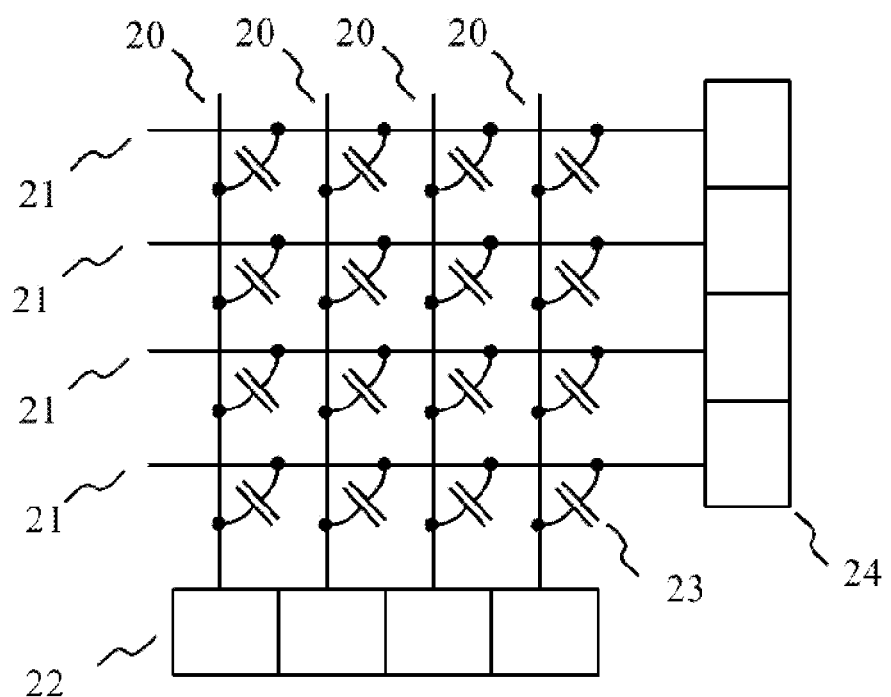
FIG. 3A shows a schematic representation of a mutual capacitive touch panel system according to the prior art.
Figure 3B:
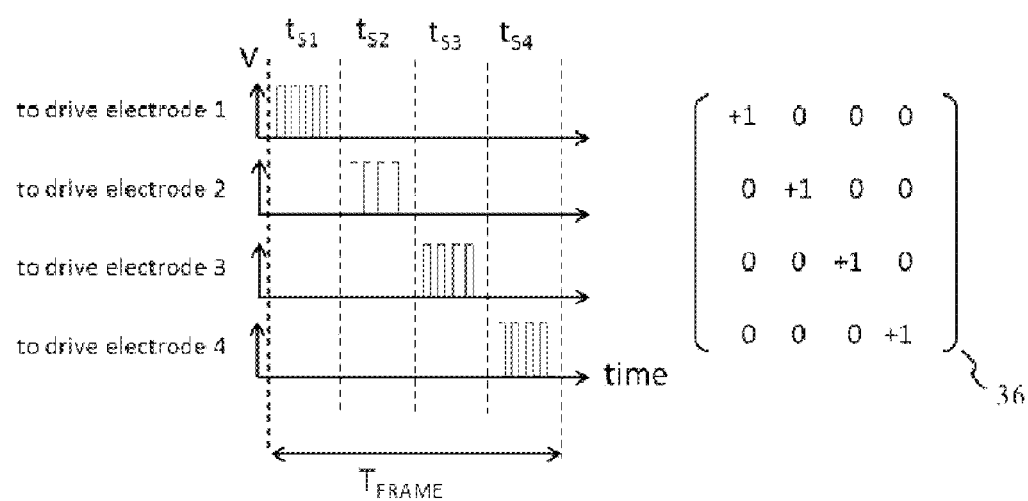
FIG. 3B shows a mathematical representation of a known measurement method for a capacitive touch panel
Figure 4:
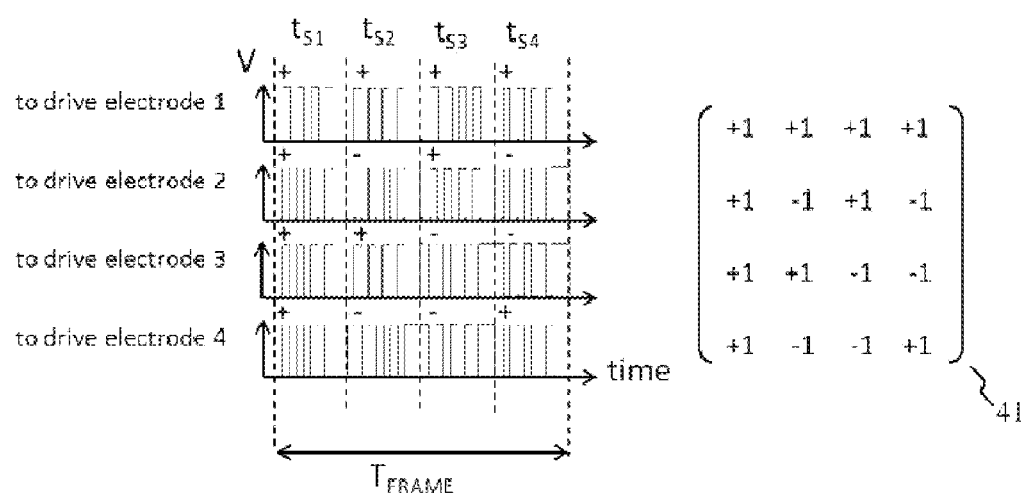
FIG. 4 shows a mathematical representation of an alternative known measurement method for a capacitive touch panel

10 Transparent substrate
11 Sensing electrode
12 Voltage source
13 Conductive object
14 Capacitor
15 Current sensor
20 Drive electrode
21 Sense electrode
22 Voltage source
23 Mutual coupling capacitor
24 Current measurement means
27 Drive electrode capacitor
28 Sense electrode capacitor
36 Matrix representation of a serial driving scheme
41 Matrix representation of a parallel driving scheme
100 Electrode array
101 Drive electrode
102 Drive unit
103 Sense electrode
104 Sense unit
105 Mutual capacitor
106 Signal generating circuit
107 Signal sensing circuit
108 Set of drive electrodes
109 Set of sense electrodes
201 Exemplary Hadamard matrix of size 8×8
202 Row containing the longest run of consecutive equal values
203 Column containing the longest run of consecutive equal values
204 Reduced matrix of size 7×7
205 Row containing the longest run of consecutive equal values
206 Column containing the longest run of consecutive equal values
207 reduced matrix of size 7×7
304 substrate
305 electrically insulating layer
306 metallization layer
307 layer of transparent conductive material
410 switching circuit
411 first sampling switch
412 second sampling switch
420 integrator circuit
421 operational amplifier
422 integration capacitor
423 reset switch
430 analogue to digital converter
510 display device
580 touch panel device
581 sense unit
582 drive unit
583 interface circuit
590 host device
591 display controller
601 drive electrode pairs
602 drive electrode A
603 drive electrode B
604 sense electrode
612 contact hole
613 first connecting wire
614 second connecting wire
701 sense electrode pairs
702 sense electrode A
703 sense electrode B
704 drive electrode
712 contact hole
713 first connecting wire
714 second connecting wire
800 sense unit
810 first multiplexing circuit
820 second multiplexing circuit
830 differential sensing circuit

DETAILED DESCRIPTION OF INVENTION

The present invention provides a touch panel, or touch sensor, device which overcomes one or more of the aforementioned limitations of the prior art and provides a means of minimizing, or eliminating, the unwanted baseline capacitance signals. As a result it is possible to create a touch sensor with a high signal-to-noise ratio (SNR) and a large dynamic range.

A touch sensor in accordance with the present invention includes a sensor substrate, and an array of electrode elements formed over the sensor substrate. Each electrode element of the array includes at least one drive electrode and at least one sense electrode. The at least one drive electrode and at least one sense electrode form at least one mutual coupling capacitor in each electrode element. The capacitances of the mutual coupling capacitors across the array may be measured and used in combination to detect the presence and location of input objects touching the surface of the touch panel. For example, the capacitances of the mutual capacitors may change in magnitude when an object is brought into close proximity to the corresponding electrode element. A controller may be operatively coupled to the array of electrode elements and configured to determine the object position based on these changes in the multiple mutual coupling capacitors.

In order to measure the capacitances of the mutual coupling capacitors, during one measurement period voltage excitation signals are applied to the drive electrodes of the electrode array and the currents generated in the sense electrodes are measured. Multiple drive electrodes may be excited during the measurement period by a first periodic voltage excitation signal with a first phase and first amplitude or a second periodic voltage excitation signal with a second phase and second amplitude. The capacitances of all mutual capacitors in the electrode array may be measured during one frame of operation that may consist of multiple measurement periods. The patterns of voltage excitation signals applied to the drive electrodes may be different during each measurement period. The patterns of voltage excitation signals applied during one frame of operation may be represented as a matrix, herein referred to as the drive matrix. The corresponding measurements of sense electrode currents during one frame of operation may also be represented as a matrix, herein referred to as the sense matrix.

In order for each of the capacitances in the electrode array to be uniquely estimated from the multiplicity of sense electrode current measurements the drive matrix must be invertible. In order to supress the unwanted offset, or baseline, signal measured by the controller, the pattern of voltage excitation signals applied during each measurement period of the frame period must be balanced. That is to say, the number of drive electrodes excited by the first voltage excitation signal should be equal, or nearly equal, to the number of drive electrodes excited by the second voltage excitation signal. As used herein, nearly equal to the number of drive electrodes means that a difference between the number of drive electrodes excited by the first voltage excitation signal and the number of drive electrodes excited by the second voltage excitation signal is no greater than 10 percent of the total number of drive electrodes. As is now described, this invention describes a method of constructing a drive matrix that minimises the baseline signal for touch sensors with an arbitrary number of drive electrodes.

Figure 5:
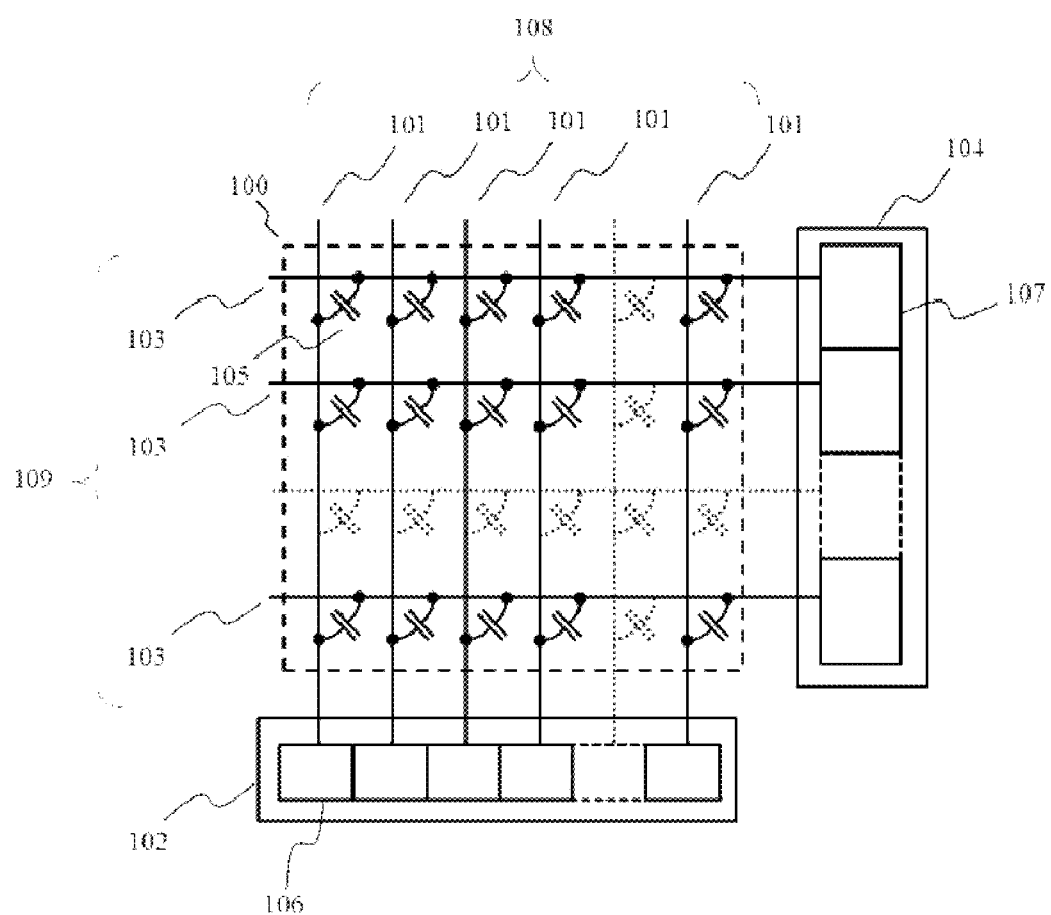
FIG. 5 shows a schematic representation of a mutual capacitive touch panel system according to a first embodiment.

In accordance with a first and most general embodiment of the invention, a mutual capacitance type touch panel device is provided that includes an electrode array 100 comprising a set of drive electrodes 108, which are coupled to a drive unit 102, and a set of sense electrodes 109, which are coupled to a sense unit 104, as shown in FIG. 5.

Mutual capacitors 105 are formed between each sense electrode 103 of the plurality of sense electrodes and each drive electrode 101 of the plurality of drive electrodes. The capacitances of the mutual capacitors formed at the intersections between each drive electrode and each sense electrode in the array can be represented as a single capacitance matrix, C, of dimension N×M where N is the number of drive electrodes in the plurality of drive electrodes, and M is the number of sense electrodes in the plurality of sense electrodes.

The drive unit 102 comprises a plurality of signal generating circuits 106 each of which is responsible for providing drive excitation signals to one of the drive electrodes of the electrode array. The sense unit 104 comprises a plurality of signal sensing circuits 107, each of which is responsible for measuring signal generated on one of the sense electrodes of the electrode array in response to the drive excitation voltage applied to the drive electrodes of the electrode array.

The capacitances of all mutual capacitors in the electrode array are measured during a frame period ($T_{FRAME}$) that consists of multiple measurement periods ($t_{S1}$, $t_{S2}$, $t_{S3}$, . . . , $t_{ST}$). In order to measure the capacitances of the mutual coupling capacitors with a high signal-to-noise ratio, during one measurement period voltage excitation signals are applied to all drive electrodes of the electrode array and the currents generated in the sense electrodes are measured. The drive electrodes are excited during the measurement period by a first periodic voltage excitation signal with a first phase and first amplitude or a second periodic voltage excitation signal with a second phase and equal amplitude. The phase of the voltage excitation signals applied in each particular measurement period may be represented as a vector Dv of dimension N. The elements of vector Dv are either +1 or −1 and represent voltage excitation signals with a phase of 0 or 180 degrees respectively. Alternatively, the amplitude of the voltage excitation signals applied in each particular measurement may be represented as a vector Dv of dimension N. In this case the magnitude of the first and second voltage excitation signals may be equal and the elements of vector Dv, which are either +1 or −1, represent the polarity of the excitation signal. The voltage excitation signals applied to the drive electrodes over the course of a single frame can be represented as matrix D, of dimension N×T, where T is the number of measurement periods in one frame. The number of measurement periods in one frame may be equal to the number of drive electrodes in the electrode array i.e. T=N, making D of dimension N×N. Each row of matrix D represents the pattern of the excitation signals applied to the drive electrodes at one particular measurement period. Each column represents the pattern of excitation signals applied to one particular drive electrode over the course of a single frame of operation.

The full set of measurements obtained from the sensor circuits during one frame of operation may be represented as a sense matrix S of dimension T×M (or N×M, since T=N). The sense matrix S may be represented by the multiplication of the drive matrix D and the capacitance matrix C. To recover the capacitances of the mutual coupling capacitors the sense matrix S multiplied by a decoding matrix U which is equal to the inverse of the drive matrix, i.e. $U=D^{-1}$. The resulting capacitance measurements may therefore be represented by a measurement matrix M where $M=U \cdot S = D^{-1} \cdot S = C$. In operation, the change in the element values of the measurement matrix M due to the presence of an input object may be monitored to determine the location of one or more objects touching the surface of the display.

In order to remove the effect of the baseline signal and therefore maximise signal-to-noise ratio and dynamic range, it is necessary to construct a balanced drive matrix. That is to say, it is necessary to construct a drive matrix in which the sum of every row is equal to, or close to, zero. As used herein, the sum of every row being close to zero means the sum is no greater than 10 percent of the total columns in the matrix. Also, in order to decode the sense matrix S, an additional requirement in the construction of the drive matrix D is that it is invertible.

Figure 6:
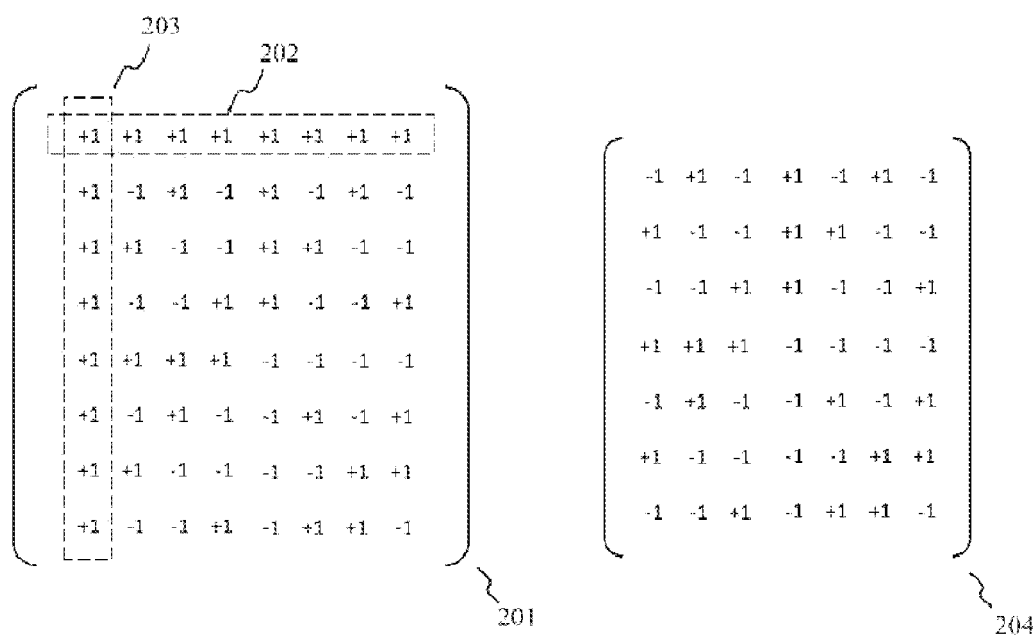
FIG. 6 shows reduction of dimensionality of an exemplary drive matrix of size 8×8 down to the drive matrix of size 7×7

The drive matrix may be constructed, for example, by first taking a Hadamard matrix of dimension H×H, where H>N. The dimension of the drive matrix is then reduced to N×N by removing equal number of rows and columns from the drive matrix. The rows and columns selected for removal are those with the longest run of consecutive equal values. If the ith row of the matrix is removed then the ith column of the matrix must also be removed. The following example is provided to illustrate the concept of creating a drive matrix of dimension N×N from an original Hadamard matrix of dimension H×H. It will be obvious to those skilled in the art that the value of N and H may be greater or less than the number chosen in this example. For an array where the number of drive electrodes in the electrode array is 7, then the required matrix can be constructed by taking a Hadamard matrix of size 8×8 201, as shown in FIG. 6 and removing the row and column with the longest run of consecutive equal values. In this example case, the 1$^{st}$ row 202 and 1$^{st}$ column 203 of the matrix are removed to obtain the required matrix of size 7×7 204 as they contain the longest run of consecutive equal values.

In a further example, if the number of drive electrodes in the electrode array is 6, a new matrix 207 (shown in FIG. 7) of the required size can be obtained by repeating the above procedure twice to remove two rows and two columns. For example an additional row and additional column may be removed from matrix 204 of dimension 7×7 to create a matrix of dimension 6×6. Here, the 4th row 206 and 4th column 205 of matrix 204 are removed as they contain the longest runs of consecutive equal values.

In the case where there is no object in proximity to the touch panel the capacitances of the mutual capacitors are equal to their baseline values. Further, the baseline capacitance values of all mutual capacitors may be the same. The sense matrix S for the baseline case is therefore given by:

$$S = D \times C \begin{bmatrix} D_{11} & D_{12} & \ldots & D_{1N} \\ D_{21} & D_{22} & \ldots & D_{2N} \\ \vdots & \vdots & \ddots & \vdots \\ D_{T1} & D_{T2} & \ldots & D_{TN} \end{bmatrix} \times \begin{bmatrix} C_{11} & C_{12} & \ldots & C_{1M} \\ C_{21} & C_{22} & \ldots & C_{2M} \\ \vdots & \vdots & \ddots & \vdots \\ C_{N1} & C_{N2} & \ldots & C_{NM} \end{bmatrix} \approx$$

$$\begin{bmatrix} 0 & 0 & \ldots & 0 \\ 0 & 0 & \ldots & 0 \\ \vdots & \vdots & \ddots & \vdots \\ 0 & 0 & \ldots & 0 \end{bmatrix}$$

It is seen that the resulting baseline sense matrix is the zero matrix as can be understood by the following explanation. If $S_{mt}$ is the signal measured by the sensing circuit connected to m-th sense electrode measured during t-th measurement period, and $D_{tn}$ is the magnitude of voltage excitation signal during the same measurement period applied to n-th drive electrode, and $C_{nm}$ is the mutual capacitance formed between n-th drive electrode and m-th sense electrode, then $$S_{mt} = \sum_{n=1}^{N} (D_{tn} \times C_{nm})$$

where N is the number of drive electrodes in the system. Since all baseline capacitance values are equal and since the drive matrix has been constructed so that the sum of every row is zero, the condition If $S_{mt}=0$ is satisfied for all m,t. The dynamic range of the system is therefore maximised as only the capacitance change signal is measured.

Figure 8A:
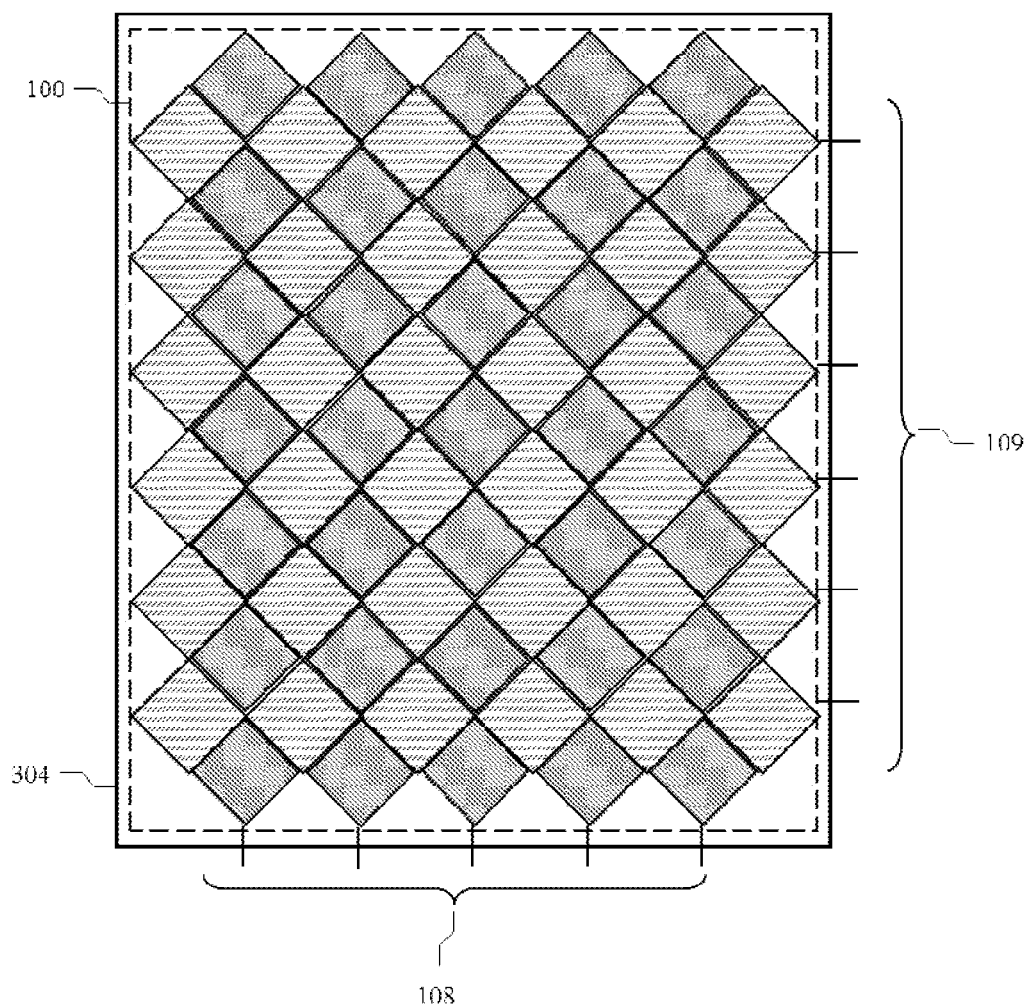
FIG. 8A shows an exemplary sensor substrate with an array of electrode elements in accordance with the present invention.
Figure 8B:
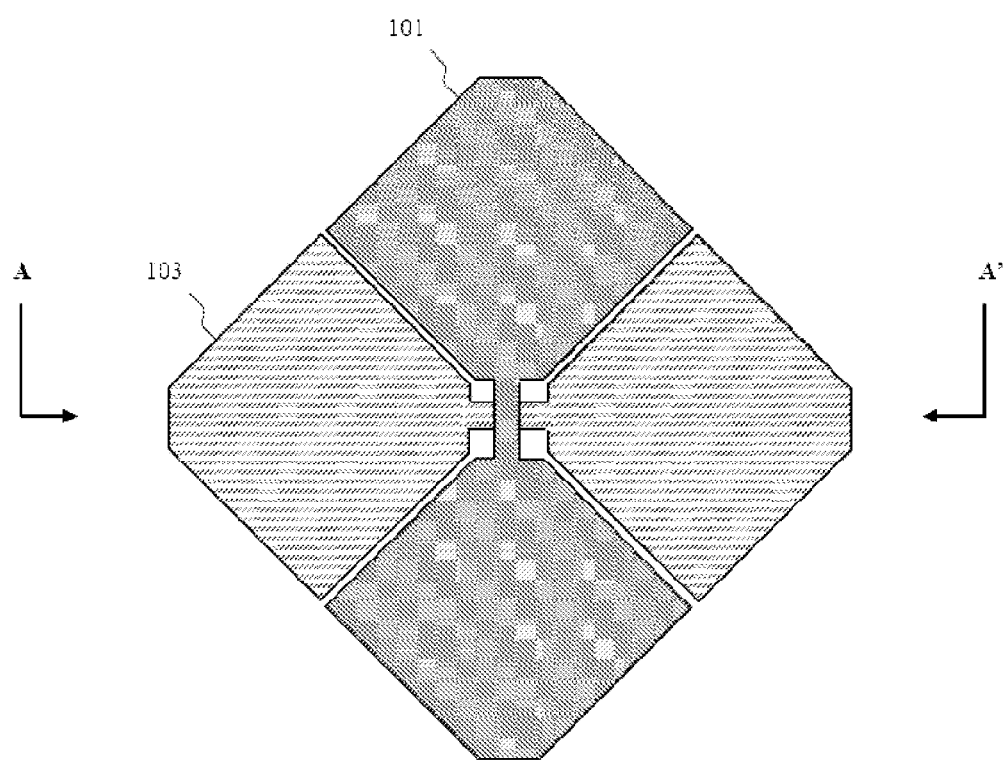
FIG. 8B shows a plan view of one electrode element of the array of electrode elements.
Figure 8C:
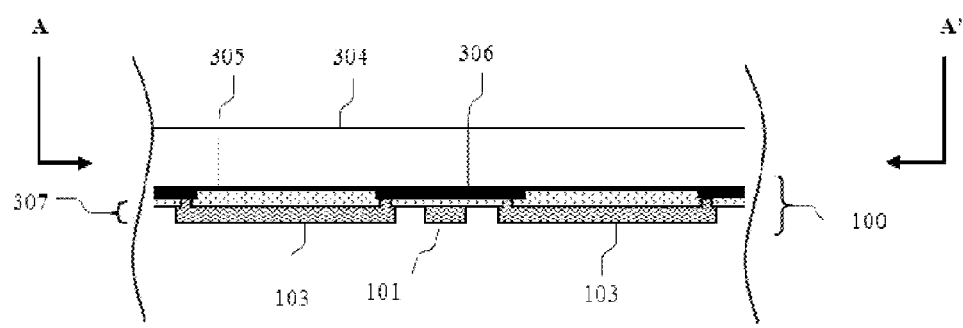
FIG. 8C shows a cross section of the sensor substrate.

An example of physical construction of an electrode array including the set of drive electrodes 108 and the set of sense electrodes 109 is shown in FIG. 8A and FIG. 8B. Each electrode of the array of electrode elements may be formed on a sensor substrate 304 using standard photolithographic or printing techniques. The electrode material may be a transparent conducting material, such as, for example, Indium-Tin Oxide (ITO), Indium Zinc Oxide (IZO) or a conductive polymer. The set of drive electrodes 108 is arranged in first direction, for example forming columns of the electrode array 100. Each drive electrode 101 in the set of drive electrodes 108 and each sense electrode 103 in the set of sense electrodes 109 are patterned into a series of connected diamonds. Alternatively, the drive electrodes 101 and sense electrodes 103 may be patterned as simple rectangular rows and columns or as other tessellating shapes to improve the signal-to-noise ratio (SNR) of the display. To avoid electrical contact between the drive electrodes 101 and the sense electrodes 103, the drive electrodes 101 may be formed on the substrate 304 in a first layer of transparent conductive material and the sense electrodes 103 formed in a second layer of transparent conductive material above the first layer and separated from it by an electrically insulating layer. Such a structure is well-known in the manufacture of capacitive touch panel devices. Alternatively, as shown in FIG. 8C, in another process well-known in the manufacture of capacitive touch panel devices, the drive electrodes 101 and sense electrodes 103 may be formed in the same layer of transparent conductive material 307 and an additional metallization layer 306 used to form bridges to interconnect separate regions of the drive electrode 101. Electrical isolation of the drive electrodes 101 from the sense electrodes 103 is achieved by forming an electrically insulating layer 305 between the metallization layer 306 and the layer of transparent conductive material 307.

Figure 9A:
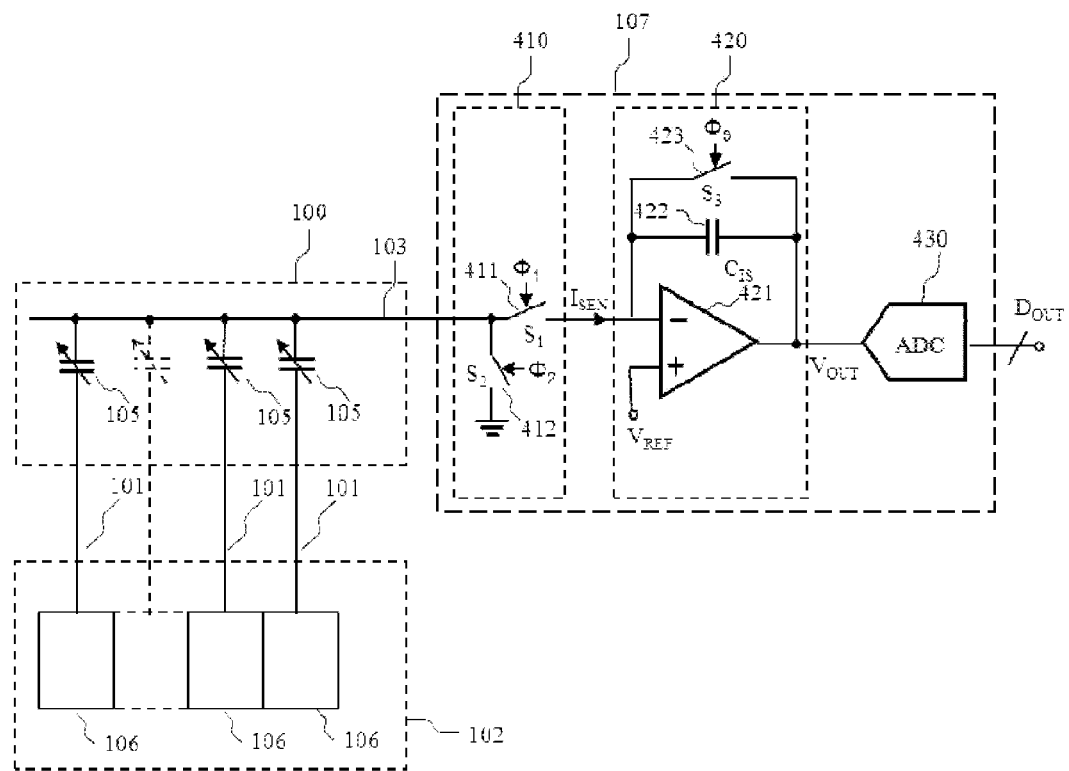
FIG. 9A shows an exemplary circuit that is able to measure a signal generated on a sense electrode

A sensing circuit may be used to measure the charge generated on the sense electrodes during a measurement period due to the excitation signals applied to the drive electrodes. The generated charge is a function of the mutual capacitances 105 formed at the intersections between drive and sense electrodes and the pattern of drive excitation signals. The sensing circuit may be based on a conventional charge-transfer method or may alternatively utilise other known mutual capacitance measurement techniques. The schematic diagram of an example sensing circuit 107 suitable for measuring the charge generated on the sense electrodes during a measurement period and using the charge-transfer method is shown in FIG. 9A. The sensing circuit 107 may comprise a switching circuit 410, a current integrator circuit 420 and an analogue to digital convertor (ADC) 430. The switching circuit includes a first sampling switch (S1) 411 that is controlled by a first switch control signal, $\phi_1$, and a second sampling switches (S2) 412 that is controlled by a second switch control signal, $\phi_2$. The current integrator circuit 420 may be of a well-known design, for example including an operational amplifier 421 with an integration capacitor ($C_{IS}$) 422 and a reset switch (S3) 423. The reset switch 423 may be controlled by a third switch control signal, $\phi_3$.

Figure 9B:
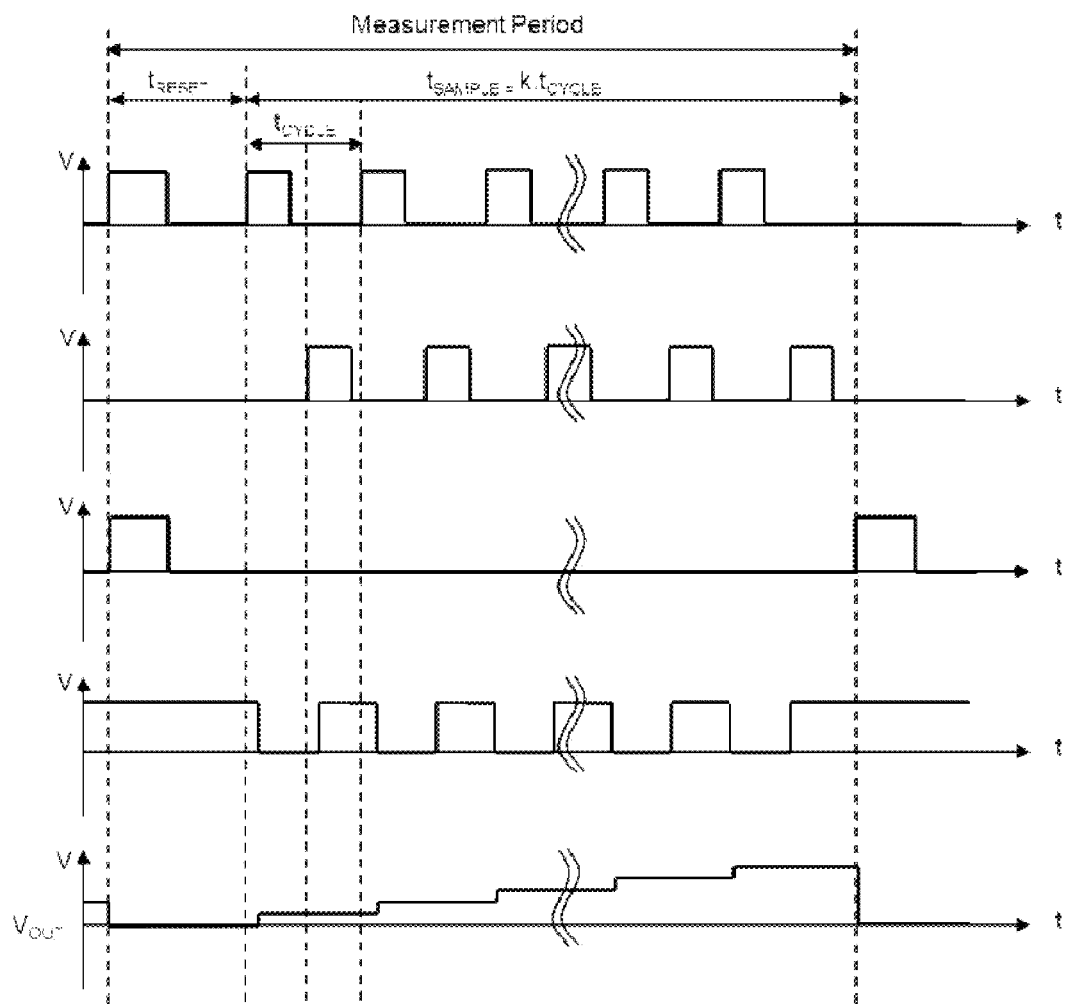
FIG. 9B shows an exemplary timing diagram that may be used to operate the circuit of FIG. 9A.

In addition to the electrode array 100 and sense unit 104, comprising one or more sensing circuits 107, the touch panel device also includes a drive unit 102 comprising one or more signal generating circuit 106, one per each drive electrode. The operation of the touch panel device is now described with reference to the schematic diagram of FIG. 9A and the waveform diagram shown in FIG. 9B. In a first reset stage at the start of the measurement period, the third switch control signal, $\phi_3$, is made active causing the first reset switch 423 of the current integrator to close. The negative input terminal of the operational amplifier 421 is now connected to the output terminal of that operational amplifier and assumes a voltage equal to the reference voltage supplied to the positive terminal of the amplifier, $V_{REF}$, which may be a fixed constant voltage such as the ground potential. The current integrator circuit 420 is now in its reset state. The first switch control signal, $\phi_1$, is also made active during the reset period causing the first sampling switch 411 of the switching circuit 410 to close. The sense electrode 103 is also reset to the reference voltage, $V_{REF}$.

In a second sampling stage, the first and the second sampling switches 411, 412 of the switching circuit 410 are controlled with respect to the voltage excitation signal applied to the drive electrodes 101 by the drive unit 102 to transfer charge from the electrode array to the current integrator circuit 420. The sampling stage is divided into a number of sampling cycles. After the second switch control signal has been made inactive, the first switch control signal is then activated causing the first sampling switch 411 to close. The sense electrode 103 is now connected to the negative input terminal of the operational amplifier 421. Each signal generating circuit 106 of the drive unit 102 now changes the voltage of the voltage excitation signal applied to the corresponding drive electrodes 101, which results in the flow of charge through each of the mutual capacitors 105. The amount and the direction of the charge flow through a particular mutual capacitor depend on the capacitance of the capacitor and the magnitude and polarity of the voltage change applied to the corresponding drive electrode. The total charge flowing into or out of the current integrator circuit 420 equals the algebraic sum of charges that flow through individual mutual capacitors. Therefore, the total charge transferred via the mutual capacitors 105 is integrated onto the integration capacitor 422 and causes the output of the operational amplifier, $V_{OUT}$ to change according to the following formula:

$$V_{OUT} = V_{REF} + \Sigma_{n=1}^{N}(\Delta V_n \times C_n),$$

where N is the number of drive electrodes, $V_n$ is the voltage change applied to n-th drive electrode and $C_n$ is the mutual capacitance formed between the sense electrode 103 and n-th drive electrode.

After the charge has been transferred, the first switch control signal, $\phi_1$, is deactivated and the second switch control signal, $\phi_2$, is made active. This causes the second sampling switch 412 to close and the first sampling switch 411 to open, and thereby set the voltage of the sense electrode 103 to be equal to the ground potential, while maintaining the charge accumulated on the integration capacitor 422. Finally, the signal generating circuits 106 return the voltage of the voltages applied to the drive electrodes of the electrode array to their original potentials. Any charge transferred from the drive electrodes to the sense electrode 103 via the electrode array 100 due to this voltage change is discharged via the second sampling switch 412, while the charge accumulated on the integration capacitor 422 is maintained.

This sampling cycle is repeated k times during the measurement period such that the total sampling time, $t_{SAMPLE} = k \cdot t_{CYCLE}$ where $t_{CYCLE}$ is the time for one sampling cycle. At the end of the measurement period, the final output voltage, $V_{OUT}$, of the differential amplifier is given by $$V_{OUT} = V_{REF} + k\sum_{n=1}^{N}(\Delta V_n \times C_n)$$

where $V_{REF}$ can be a ground potential. The analogue to digital converter circuit 430 converts this final differential amplifier output voltage, $V_{OUT}$, into a digital value, $D_{OUT}$ suitable for further processing.

Figure 9C:
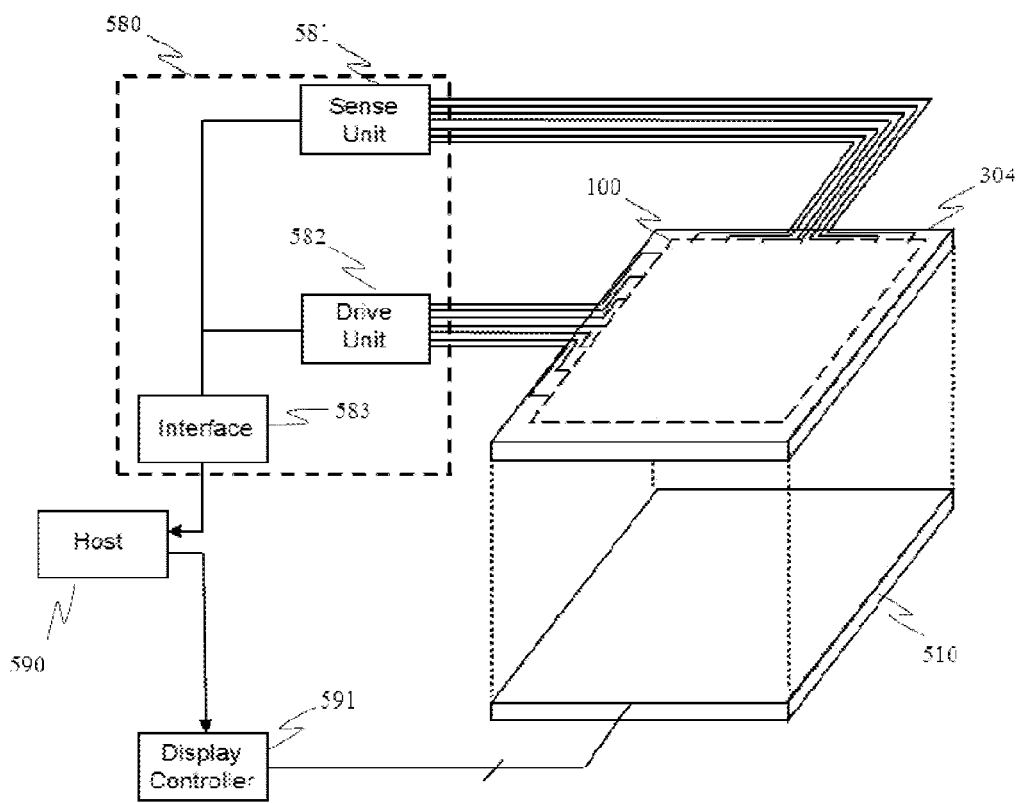
FIG. 9C shows an exemplary system that makes use of the touch sensor.

A touch panel device utilising the electrode array and circuits described above is shown in FIG. 9C. The touch panel device 580 is connected to a host device 590—for example a mobile phone, Tablet PC or the like—and comprises a sense unit 581, driver unit 582 and an interface unit 583. The sense unit 581 may contain the sensor circuits and be connected to the set of sense circuits 109 of the electrode array 100 by connecting wires. The sense unit 581 may, for example, contain as many sense circuits 107 as there are sense electrodes in the electrode array 100. The drive unit 582 may include the drive circuits that generate the voltage excitation signals and be connected to the set of drive electrodes 108 of the electrode array 100 by connecting wires. The drive unit 582 may, for example, contain as many drive circuits 106 as there are drive electrodes in the electrode array 100. The interface circuit 583 may generate signals to control the operation of the sense unit 581 and drive unit 582. The interface unit 583 may also receive the digital output signals from the sense unit 581, calculate the location of objects touching the surface of the touch panel device from this and communicate this result to the host device 590. The host device may then update the image shown on the display device 510 in accordance with the result via a display controller 591. It will be understood by those normally skilled in the art that there are many equivalent arrangements of these components and functions. For example, in an alternative arrangement the interface unit 583 may communicate the digital output signals from the sense unit 581 directly to the host device 590 and the host device 590 may calculate the location of objects touching the surface of the touch panel.

A limitation of the method described above is that it relies on the assumption that the baseline capacitance of all mutual capacitors formed between drive and sense electrodes of the electrode array are approximately equal. This is, however, not always the case. For example, each electrode element in the array may contain more than one drive electrode or more than one sense electrode. Such an arrangement may be useful, for example, to improve the performance of the touch panel or to detect the height of objects above the touch panel surface. An array of electrode elements with more than one drive electrode or more than one sense electrode in each electrode element is disclosed in U.S. application Ser. No. 13/435,898 filed on Mar. 30, 2012, which is herein incorporated by reference in its entirety. In one embodiment of the disclosure two types of drive electrodes are arranged in such configuration that two drive and one sense electrode are provided at each intersection in the array. The electrodes are further arranged such that, for example, a first drive electrode of a drive electrode pair is separated from a sense electrode by a shorter distance, in the plane of the sensor substrate, than a second drive electrode of the drive electrode pair. Two separate mutual coupling capacitors are therefore formed in each electrode element, the baseline capacitances of which may not be equal. Accordingly, the existence of mutual coupling capacitors with different baseline values creates a non-zero baseline sense matrix as described above. The dynamic range of the touch panel is therefore reduced.

An alternative arrangement for an array of electrode elements with more than one drive electrode or more than one sense electrode in each electrode element is disclosed in U.S. application Ser. No. 13/436,010 filed on Mar. 30, 2012, which is herein incorporated by reference in its entirety.

Figure 10A:
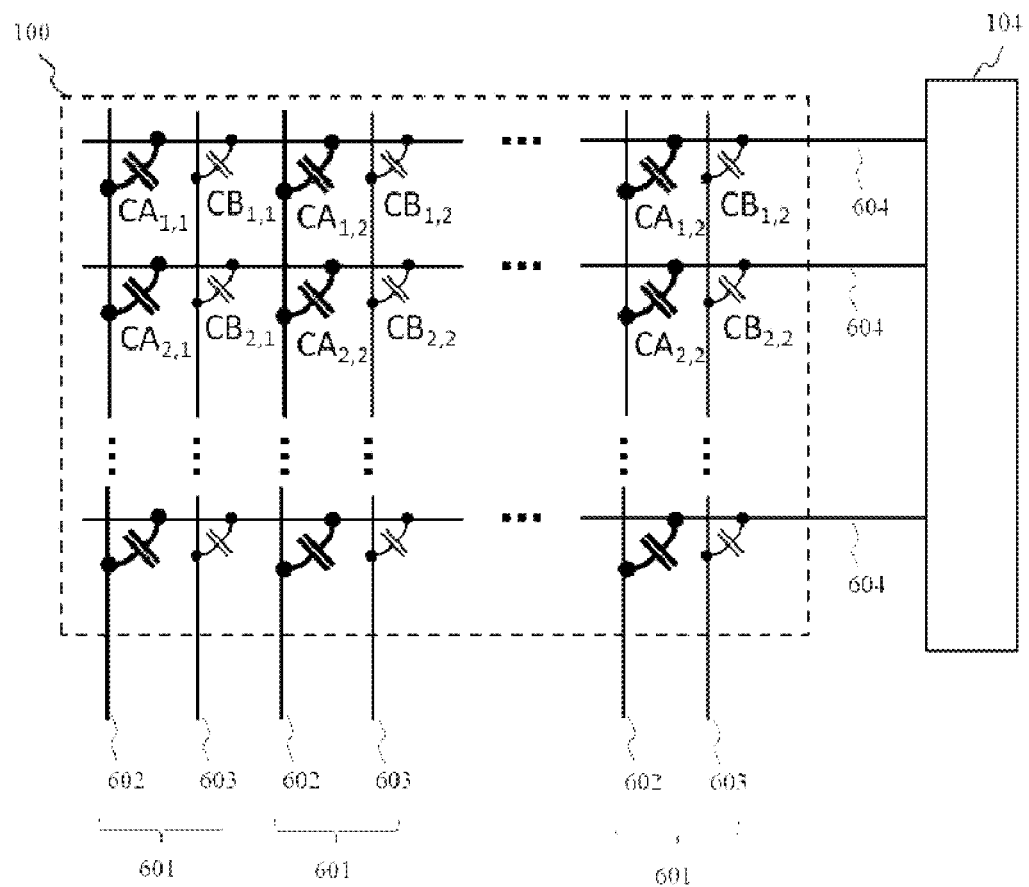
FIG. 10A shows a schematic representation of an array of electrode elements according to the second and third embodiments.
Figure 10B:
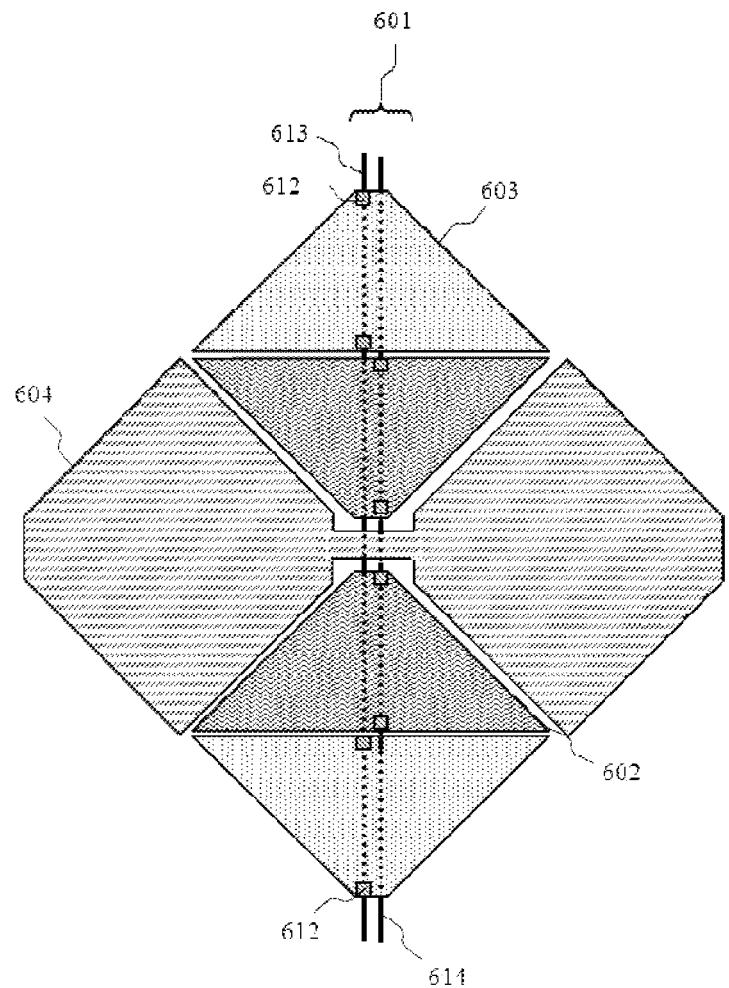
FIG. 10B shows a plan view of an exemplary electrode element with more than one drive electrode

In accordance with a second embodiment of the invention, a method is provided to create a drive matrix suitable for measuring with high dynamic range the capacitances of an electrode array with more than one drive electrode in each electrode element. An exemplary arrangement of electrode array in accordance with the present embodiment is shown schematically in FIG. 10A. An exemplary arrangement of an electrode element in accordance with the present embodiment is shown in FIG. 10B. The electrode element includes a pair of drive electrodes 601 and a sense electrode 604. Different parts of the same drive electrode may be connected by connecting wires 613, 614 and contact holes 612. Each drive electrode pair 601 includes a first drive electrode, drive electrode A 602, and a second drive electrode, drive electrode B 603. As shown in FIG. 10B, the two electrodes 602, 603 are arranged symmetrically around each drive electrode such that the first drive electrodes is adjacent to the sense electrode whilst the second drive electrode is separated from the sense electrode by the first drive electrode. Each electrode element therefore includes a first mutual coupling capacitor CA formed between drive electrode A and the sense electrode and a second mutual coupling capacitor CB formed between drive electrode B and the sense electrode wherein: the baseline capacitance of the first mutual capacitor CA for each electrode element in the array may be the same; the baseline capacitance of the second mutual capacitor CB for each electrode element in the array may be the same; and the baseline capacitance of the first mutual capacitor CA and the first mutual capacitor CB may be different.

The capacitances of the mutual capacitors formed at the intersections between drive electrodes and sense electrodes can be represented as a single matrix C of dimension 2N×M, where M is the number of sense electrodes in the electrode array and N is the number of drive electrode pairs i.e. B=2N where B is the total number of all drive electrodes. This matrix is shown in FIG. 10C. First half of rows of matrix C contain equal elements CA that represent mutual capacitances between drive electrodes A and sense electrodes of the electrode array, while the second half of rows of matrix C contain equal elements CB that represent mutual capacitances between drive electrodes B and sense electrodes of the electrode array.

The pattern of excitation signals applied to the drive electrodes A and drive electrodes B over the course of a single frame period can be represented as a drive matrix D2 of dimension 2N×2N, where N is the number of drive electrodes A, which is also equal to the number of drive electrodes B (and also equal to the number of drive electrode pairs). The first half of the columns of drive matrix D2 represents the signals supplied to each of the drive electrodes A 602 over the course of the frame period. The second half of the columns representing the signal supplied to each of the drive electrodes B 603 over the course of the frame period. The first half of the rows of this matrix may represent a first phase of the frame period and the second half of the rows represent a second phase of the frame period. In the first phase the drive electrodes A may be active and the drive electrodes B may be idle. In the second phase the drive electrodes A may be idle and the drive electrodes B may be active. Accordingly, the upper-right and lower-left quadrants of the drive matrix are filled with zeroes, while the upper-left and lower-right quadrants may each be constructed in a similar manner to the drive matrix D of the previous embodiment. The form of the drive matrix and the capacitance matrix and the relationship between these and the sense matrix is shown in FIG. 11.

The capacitances of the electrode array may be measured in one frame of operation as described for the previous embodiment. That is to say, the full set of measurements obtained from the sensor circuits during one frame of operation may be represented as a sense matrix S. To recover the capacitances of the individual mutual coupling capacitors. the sense matrix S may then be multiplied by a decoding matrix U which is the inverse of the drive matrix D2. The resulting measured capacitances may therefore be represented by the measurement matrix M where $M=U \cdot S=D2^{-1} \cdot S=C$.

Since all mutual capacitances CA are approximately equal among each other and all mutual capacitances CB are approximately equal among each other, and the sum of elements of any row of D2 is approximately equal to 0, and D2 is non-singular, the baseline signal measured by the sensing circuits is approximately equal to 0. The dynamic range of the sensing elements of the touch panel system is therefore maximized.

A limitation of the method described above is that during any given measurement period, only half of the drive electrodes are excited with drive excitation voltages, while the other half of the drive electrodes is idle. This reduces the signal-to-noise ratio of the capacitance measurement to below its maximum achievable value.

In accordance with a third embodiment of the invention, a method is provided to create a drive matrix suitable for measuring with high dynamic range and maximum achievable signal-to-noise ratio the capacitances of an electrode array with more than one drive electrode in each electrode element. The present embodiment of this invention utilises the same electrode structure as the one utilised by the second embodiment, however in the present embodiment the drive matrix is constructed in such way that all drive electrodes are supplied with either first or second voltage excitation signal during any given measurement period. Furthermore, the drive matrix is constructed in such a way that the baseline signal measured by all sensing circuits during any given measurement period of the frame period, is close to zero when no input object is present in the vicinity of the electrode array, therefore maximising the dynamic range of the system.

As previously, the capacitances of the all mutual capacitors in the array of electrode elements are represented as a single matrix, C of dimension 2N×M, where N is the number of drive electrodes A, which is also equal to the number of drive electrodes B, and M is the number of sense electrodes in the electrode array. The first half of rows of matrix C contain elements CA that represent mutual capacitances between drive electrodes A and sense electrodes of the electrode array, while the second half of rows of matrix C contain elements CB that represent mutual capacitances between drive electrodes B and sense electrodes of the electrode array. The voltage excitation signals applied to the drive electrodes A and drive electrodes B over the course of a single frame period can be represented as matrix D3 of dimension 2N×2N, where N is the number of drive electrodes A which is also equal to the number of drive electrodes B. The first half of the columns represent the voltage excitation signal applied to the drive electrodes A over the course of the frame period, and the second half of the columns represent the voltage excitation signal applied to the drive electrodes B over the course of the frame period. FIG. 12 shows the form of capacitance matrix C and the drive matrix D3, as well as expressions for sense matrix S, the decoding matrix U and the measurement matrix M.

The baseline capacitances of all first mutual capacitors CA can be assumed to be equal among each other, and the baseline capacitance of all second mutual capacitors CB can be assumed to also be equal among each other. Accordingly, to achieve a baseline sense matrix that is approximately equal to zero, the sum of elements in first half of each row of the drive matrix must be approximately equal to 0, and also the sum of all elements in second half of each row of the drive matrix must be approximately equal to 0. As used herein, the sum of elements in the first half of each row of the drive matrix being approximately equal to 0 means the sum is no greater than 10 percent of the total number of columns in the matrix.

To meet these requirements the drive matrix D3 of the present embodiment may, for example, be constructed by applying a well-known Sylvester type construction method using a primary drive matrix D of dimension N×N as illustrated in FIG. 12. The primary drive matrix D may be constructed using the method described previously for the first embodiment of this invention.

Figure 13:
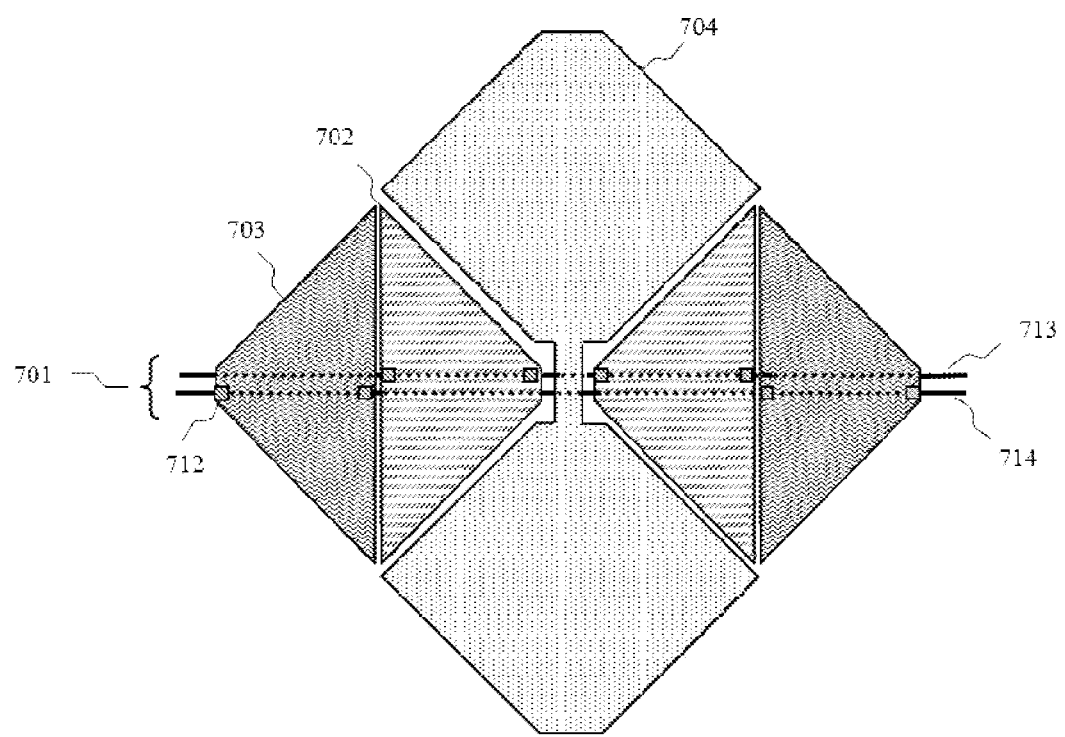
FIG. 13 shows a plan view of an exemplary electrode element with more than one sense electrode

It is well-known that the signal-to-noise ratio of a touch panel may be improved by using a differential sensor circuit to measure the current generated on the sense electrodes. A suitable differential sensor circuit is disclosed, for example, in International Patent Application PCT/JP2012/006680 filed on 18 Oct. 2012. Further it is known that more than one sense electrode may be provided in each electrode element for the purposes of improving SNR or measuring the height of the input object above the touch panel surface. For example, FIG. 13 shows a known arrangement of an electrode element that comprises a sense electrode pair 701 and a drive electrode 704. The sense electrode pair further comprises a first sense electrode 702 and a second sense electrode 703. Different parts of the same sense electrode may be connected by connecting wires 713, 714 and contact holes 712.

Figure 14:
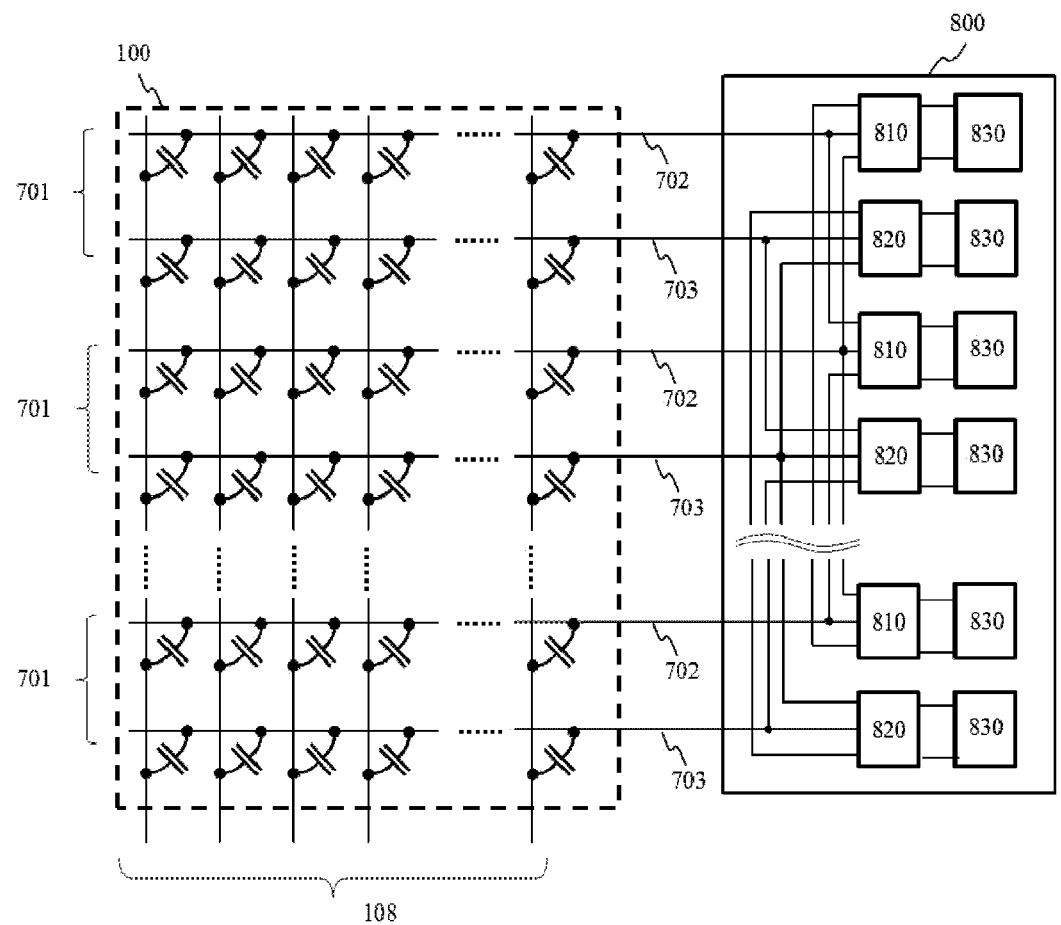
FIG. 14 shows a schematic diagram of interconnection between sense electrodes and sense unit according to the fourth embodiment.

In accordance with a fourth embodiment of the invention, a method is provided for measuring with high dynamic range and maximum achievable signal-to-noise ratio the capacitances of an electrode array with more than one sense electrode in each electrode element. As shown in FIG. 14, an array of electrode elements 100 including a set of drive electrodes 108 and sense electrode pairs 701 may be connected to a sense unit 800 which includes a differential sensing apparatus. The differential sensing apparatus may include first multiplexer circuits 810, second multiplexer circuits 820 and differential sensing circuits 830. The sense electrodes may be connected to the sense unit as illustrated such that the first sense electrodes 702 are connected to the first multiplexing circuits 810 and the second sense electrodes 703 are connected to the second multiplexing circuits 820.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICATION

The invention finds application in touch panels and touchscreen devices, for industrial and consumer electronics. It is ideally suited to products such as mobile phones, tablet computers, 'e-readers,' and interactive public information terminals.

What is claimed is:

1. A capacitive touch sensor, comprising:
an array of electrode elements, each electrode element including a drive electrode and a sense electrode, the drive electrode and the sense electrode forming at least one mutual coupling capacitor in each electrode element; and
a controller operatively coupled to the array of electrode elements, the controller configured to provide excitation signals to the array of electrode elements over at least one measurement period, and to measure the at least one mutual coupling capacitance over the at least one measurement period, wherein the excitation signals applied during the at least one measurement period are balanced to reduce the effect of baseline capacitance,
wherein the controller is configured to represent the excitation signals applied to the drive electrodes over one frame as a drive matrix D having dimension N×T, where N is the number of drive electrodes in the array of electrode elements and T is the number of measurement periods in the one frame, each row of the matrix representing a pattern of excitation signals applied to the drive electrodes during a measurement period, and each column of the matrix representing a pattern of excitation signals applied to one drive electrode over the course of a single frame.

2. The touch sensor according to claim 1, wherein the at least one measurement period comprises a first measurement period and a second measurement period, and the excitation signal applied during the first measurement period is different from the excitation signal applied during the second measurement period.

3. The touch sensor according to claim 2, wherein the number of drive electrodes excited by the excitation signal during the first measurement period is substantially the same as the number of drive electrodes excited during the second measurement period.

4. The touch sensor according to claim 1, wherein the excitation signals comprise at least one of a first voltage signal having a first amplitude and first phase, a second voltage signal having a second amplitude and second phase, or a constant voltage.

5. The touch sensor according to claim 1, where the controller is configured to represent measurements of each sense electrode during the one frame as a sense matrix S having dimension T×M, where M is the number of sense electrodes.

6. The touch sensor according to claim 5, wherein the controller is configured to determine the capacitances of the mutual coupling capacitors by multiplying the sense matrix S by the inverse of the drive matrix D.

7. The touch sensor according to claim 1, wherein a first excitation signal is represented in the drive matrix D as a 1 and a second excitation signal is represented in the drive matrix D as a −1, and wherein the drive matrix D is chosen such that the sum of each row of the drive matrix is approximately 0.

8. The touch sensor according to claim 1, wherein the controller is configured to measure the mutual capacitances in the array during a frame period that includes multiple measurement periods.

9. The touch sensor according to claim 1, further comprising:
a drive unit coupled to the array of electrode elements, the drive unit configured to provide a drive excitation signal to the drive electrodes of the array of electrode elements,
wherein the controller is operatively coupled to the drive unit to cause the drive unit to provide the drive excitation signal to the drive electrodes of the electrode array.

10. The touch sensor according to claim 9, wherein the drive unit comprises a plurality of signal generating circuits, each signal generating circuit providing a drive excitation signal to a respective drive electrode of the array of electrode elements.

11. The touch sensor according to claim 1, further comprising a sense unit coupled to the array of electrode elements, the sense unit configured to measure a signal generated on the sense electrodes in response to the drive excitation signal applied to the drive electrodes.

12. The touch sensor according to claim 11, wherein the sense unit comprises a plurality of signal sensing circuits, each signal sensing circuit operative to measure a signal generated on a respective sense electrode of the array of electrode elements in response to the drive excitation signal.

13. The touch sensor according to claim 1, wherein each electrode of the array of electrode elements comprises a sense electrode and a pair of drive electrodes, the pair of drive electrodes arranged such that a first drive electrode of the pair is adjacent to the sense electrode, and a second drive electrode of the pair is separated from the sense electrode by the first drive electrode.

14. The touch sensor according to claim 13, wherein the controller is configured to represent the excitation signals applied to the drive electrodes over one frame as a drive matrix D2 having dimension 2N×2N, where N is the number of drive electrode pairs in the array of electrode elements, and wherein a first half of the columns of the drive matrix D2 represents signals supplied to each first drive electrode over the course of a frame period and a second half of the columns represents signals supplied to each second drive electrode over the course of the frame period, a first half of the rows of the drive matrix D2 represent a first phase of the frame period and a second half of the rows of the drive matrix D2 represent a second phase of the frame period.

15. The touch sensor according to claim 14, where the controller is configured to represent measurements of each sense electrode during the one frame as a sense matrix S having dimension T×M, where T is the number of measurement periods in the one frame and M is the number of sense electrodes.

16. The touch sensor according to claim 15, wherein the controller is configured to determine the capacitances of the mutual coupling capacitors by multiplying the sense matrix S by the inverse of the drive matrix D2.

17. The touch sensor according to claim 14, wherein a sum of all elements in a first half of each row of the drive matrix is approximately 0, and a sum of all elements in a second half of each row of the drive matrix is approximately 0.

18. The touch sensor according to claim 14, wherein the drive matrix is constructed such that all drive electrodes are supplied with a first excitation signal or a second excitation signal during any measurement.

19. The touch sensor according to claim 1, wherein each electrode element comprises a sense electrode pair, further comprising a differential sensing device operatively coupled to the sense electrode pairs.

* * * * *